(12) United States Patent
Dropps et al.

(10) Patent No.: US 7,404,020 B2
(45) Date of Patent: Jul. 22, 2008

(54) INTEGRATED FIBRE CHANNEL FABRIC CONTROLLER

(75) Inventors: Frank R. Dropps, Maple Grove, MN (US); William J. Gustafson, Apple Valley, MN (US); Leonard W. Haseman, Eagan, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 628 days.

(21) Appl. No.: 10/894,529

(22) Filed: Jul. 20, 2004

(65) Prior Publication Data

US 2006/0020725 A1   Jan. 26, 2006

(51) Int. Cl.
*G06F 13/38* (2006.01)

(52) U.S. Cl. .............. 710/71; 710/8; 710/306; 370/258

(58) Field of Classification Search .......... None
See application file for complete search history.

(56) References Cited

U.S. PATENT DOCUMENTS

| | | | |
|---|---|---|---|
| 4,162,375 A | 7/1979 | Schilichte | 179/15 |
| 4,200,929 A | 4/1980 | Davidjuk et al. | |
| 4,382,159 A * | 5/1983 | Bowditch | 381/120 |
| 4,425,640 A | 1/1984 | Philip et al. | 370/58 |
| 4,546,468 A | 10/1985 | Christmas et al. | 370/54 |
| 4,569,043 A | 2/1986 | Simmons et al. | 370/63 |
| 4,725,835 A | 2/1988 | Schreiner et al. | 340/825.83 |
| 4,821,034 A | 4/1989 | Anderson et al. | 340/825 |
| 4,980,857 A | 12/1990 | Walter et al. | |
| 5,051,742 A | 9/1991 | Hullett et al. | |
| 5,115,430 A | 5/1992 | Hahne et al. | |
| 5,144,622 A | 9/1992 | Takiyasu et al. | 370/85.13 |

(Continued)

FOREIGN PATENT DOCUMENTS

EP   0649098   9/1994

(Continued)

OTHER PUBLICATIONS

Arie Tal, Two Technologies compared: NOR vs. NAND, Jul. 2003, M-systems, pp. 1-14.*

(Continued)

*Primary Examiner*—Henry Tsai
*Assistant Examiner*—Dean Phan
(74) *Attorney, Agent, or Firm*—Klein, O'Neill & Singh, LLP (57) ABSTRACT

A fibre channel switch element with an integrated fabric controller on a single chip is provided. The fabric controller including a processor module that can control various switch element functions; a serlizer/de-serializer for converting parallel data to serial data for transmission; an on-chip peripheral bus that allows communication between plural components and the processor module; a processor local bus and an interrupt controller that provides interrupts to the processor module. The integrated fabric controller also includes a flash controller and an external memory controller; an Ethernet controller; a Universal Asynchronous Receiver Transmitter ("UART") module that performs serial to parallel conversion and vice-versa; an I²C module that performs serial to parallel and parallel to serial conversion; a general-purpose input/output interface; a real time clock module; an interrupt controller that can receive interrupts inputs from both internal and external sources; and a bridge to an internal PCI bus.

19 Claims, 6 Drawing Sheets

U.S. PATENT DOCUMENTS

| | | | |
|---|---|---|---|
| 5,260,933 A | 11/1993 | Rouse | |
| 5,367,520 A | 11/1994 | Cordell | 370/60 |
| 5,590,125 A | 12/1996 | Acampora et al. | |
| 5,598,541 A | 1/1997 | Malladi | 395/286 |
| 5,610,745 A | 3/1997 | Bennett | 359/139 |
| 5,623,492 A | 4/1997 | Teraslinna | |
| 5,666,483 A | 9/1997 | McClary | |
| 5,687,172 A | 11/1997 | Cloonan et al. | 370/395 |
| 5,701,416 A | 12/1997 | Thorson et al. | |
| 5,706,279 A | 1/1998 | Teraslinna | |
| 5,748,612 A | 5/1998 | Stoevhase et al. | 370/230 |
| 5,812,525 A | 9/1998 | Teraslinna | |
| 5,818,842 A | 10/1998 | Burwell et al. | 370/397 |
| 5,821,875 A | 10/1998 | Lee et al. | |
| 5,825,748 A | 10/1998 | Barkey et al. | |
| 5,828,475 A | 10/1998 | Bennett et al. | |
| 5,835,752 A * | 11/1998 | Chiang et al. | 713/400 |
| 5,850,386 A | 12/1998 | Anderson et al. | |
| 5,894,560 A | 4/1999 | Carmichael et al. | |
| 5,954,796 A | 9/1999 | McCarty et al. | |
| 5,978,359 A | 11/1999 | Caldara et al. | |
| 5,987,028 A | 11/1999 | Yang et al. | 370/380 |
| 5,999,528 A | 12/1999 | Chow et al. | 370/365 |
| 6,014,383 A | 1/2000 | McCarty | 370/453 |
| 6,021,128 A | 2/2000 | Hosoya et al. | 370/380 |
| 6,026,092 A | 2/2000 | Abu-Amara et al. | |
| 6,031,842 A | 2/2000 | Trevitt et al. | |
| 6,047,323 A | 4/2000 | Krause | 709/227 |
| 6,055,618 A | 4/2000 | Thorson | |
| 6,061,360 A | 5/2000 | Miller et al. | |
| 6,081,512 A | 6/2000 | Muller et al. | 370/256 |
| 6,108,738 A * | 8/2000 | Chambers et al. | 710/113 |
| 6,108,778 A * | 8/2000 | LaBerge | 713/1 |
| 6,118,776 A | 9/2000 | Berman | |
| 6,128,292 A | 10/2000 | Kim et al. | 370/356 |
| 6,144,668 A | 11/2000 | Bass et al. | |
| 6,160,813 A | 12/2000 | Banks et al. | 370/422 |
| 6,201,787 B1 | 3/2001 | Baldwin et al. | |
| 6,229,822 B1 | 5/2001 | Chow et al. | |
| 6,240,096 B1 | 5/2001 | Book | |
| 6,253,267 B1 * | 6/2001 | Kim et al. | 710/302 |
| 6,289,002 B1 | 9/2001 | Henson et al. | |
| 6,308,220 B1 | 10/2001 | Mathur | 709/238 |
| 6,324,181 B1 | 11/2001 | Wong et al. | 370/403 |
| 6,330,236 B1 | 12/2001 | Ofek et al. | 370/369 |
| 6,343,324 B1 | 1/2002 | Hubis et al. | |
| 6,353,612 B1 | 3/2002 | Zhu et al. | |
| 6,370,605 B1 | 4/2002 | Chong | |
| 6,401,128 B1 | 6/2002 | Stai et al. | |
| 6,411,599 B1 | 6/2002 | Blanc et al. | 370/219 |
| 6,411,627 B1 | 6/2002 | Hullett et al. | |
| 6,418,477 B1 | 7/2002 | Verma | |
| 6,421,711 B1 | 7/2002 | Blumenau et al. | |
| 6,424,658 B1 | 7/2002 | Mathur | 370/429 |
| 6,449,274 B1 | 9/2002 | Holden et al. | 370/392 |
| 6,452,915 B1 | 9/2002 | Jorgensen | |
| 6,457,090 B1 | 9/2002 | Young | |
| 6,467,008 B1 | 10/2002 | Gentry, Jr. et al. | 710/261 |
| 6,470,026 B1 | 10/2002 | Pearson et al. | |
| 6,532,212 B1 | 3/2003 | Soloway et al. | |
| 6,570,850 B1 | 5/2003 | Gutierrez et al. | |
| 6,570,853 B1 | 5/2003 | Johnson et al. | |
| 6,594,231 B1 | 7/2003 | Byham et al. | |
| 6,597,691 B1 | 7/2003 | Anderson et al. | 370/360 |
| 6,597,777 B1 | 7/2003 | Ho | |
| 6,614,796 B1 | 9/2003 | Black et al. | |
| 6,697,359 B1 | 2/2004 | George | 370/357 |
| 6,697,368 B2 | 2/2004 | Chang et al. | |
| 6,718,497 B1 | 4/2004 | Whitby-Strevens | |
| 6,744,772 B1 | 6/2004 | Eneboe et al. | |
| 6,760,302 B1 | 7/2004 | Ellinas et al. | |
| 6,785,241 B1 | 8/2004 | Lu et al. | |
| 6,807,181 B1 | 10/2004 | Weschler | |
| 6,816,750 B1 * | 11/2004 | Klaas | 700/121 |
| 6,859,435 B1 | 2/2005 | Lee et al. | |
| 6,865,157 B1 | 3/2005 | Scott et al. | |
| 6,941,357 B2 | 9/2005 | Nguyen et al. | |
| 6,941,482 B2 | 9/2005 | Strong | |
| 6,952,659 B2 * | 10/2005 | King et al. | 702/186 |
| 6,968,463 B2 | 11/2005 | Pherson et al. | |
| 7,000,025 B1 | 2/2006 | Wilson | |
| 7,002,926 B1 | 2/2006 | Eneboe et al. | |
| 7,010,607 B1 | 3/2006 | Bunton | |
| 7,039,070 B2 | 5/2006 | Kawakatsu | |
| 7,039,870 B2 | 5/2006 | Takaoka et al. | |
| 7,047,326 B1 | 5/2006 | Crosbie et al. | |
| 7,050,392 B2 | 5/2006 | Valdevit | |
| 7,055,068 B2 | 5/2006 | Riedl | |
| 7,061,871 B2 | 6/2006 | Sheldon et al. | |
| 7,092,374 B1 * | 8/2006 | Gubbi | 370/338 |
| 7,110,394 B1 | 9/2006 | Chamdani et al. | |
| 7,124,169 B2 | 10/2006 | Shimozono et al. | |
| 7,151,778 B2 | 12/2006 | Zhu et al. | |
| 7,171,050 B2 * | 1/2007 | Kim | 382/323 |
| 7,185,062 B2 | 2/2007 | Lolayekar et al. | |
| 7,188,364 B2 | 3/2007 | Volpano | |
| 7,190,667 B2 | 3/2007 | Susnow et al. | |
| 7,194,538 B1 | 3/2007 | Rabe et al. | |
| 7,200,108 B2 | 4/2007 | Beer et al. | |
| 7,215,680 B2 | 5/2007 | Mullendore et al. | |
| 7,221,650 B1 | 5/2007 | Cooper et al. | |
| 7,245,613 B1 | 7/2007 | Winkles et al. | |
| 7,248,580 B2 | 7/2007 | George et al. | |
| 7,269,131 B2 | 9/2007 | Cashman et al. | |
| 7,292,593 B1 | 11/2007 | Winkles et al. | |
| 2001/0011357 A1 | 8/2001 | Mori | |
| 2001/0038628 A1 | 11/2001 | Ofek et al. | 370/392 |
| 2002/0034178 A1 | 3/2002 | Schmidt et al. | |
| 2002/0071387 A1 | 6/2002 | Horiguchi et al. | |
| 2002/0103913 A1 | 8/2002 | Tawil et al. | |
| 2002/0104039 A1 | 8/2002 | DeRolf et al. | |
| 2002/0124124 A1 | 9/2002 | Matsumoto et al. | |
| 2002/0147560 A1 * | 10/2002 | Devins et al. | 702/118 |
| 2002/0147843 A1 | 10/2002 | Rao | |
| 2002/0156918 A1 | 10/2002 | Valdevit et al. | |
| 2002/0159385 A1 | 10/2002 | Susnow et al. | |
| 2002/0172195 A1 | 11/2002 | Pekkala et al. | |
| 2002/0191602 A1 | 12/2002 | Woodring et al. | |
| 2002/0196773 A1 | 12/2002 | Berman | |
| 2003/0016683 A1 | 1/2003 | George et al. | |
| 2003/0021239 A1 | 1/2003 | Mullendore et al. | |
| 2003/0026267 A1 | 2/2003 | Oberman et al. | |
| 2003/0026287 A1 | 2/2003 | Mullendore et al. | |
| 2003/0035433 A1 | 2/2003 | Craddock et al. | |
| 2003/0046396 A1 | 3/2003 | Richter et al. | |
| 2003/0056000 A1 | 3/2003 | Mullendore et al. | |
| 2003/0072316 A1 | 4/2003 | Niu et al. | |
| 2003/0079019 A1 | 4/2003 | Lolayekar et al. | |
| 2003/0084219 A1 | 5/2003 | Yao et al. | |
| 2003/0086377 A1 | 5/2003 | Berman | |
| 2003/0091062 A1 | 5/2003 | Lay et al. | |
| 2003/0103451 A1 | 6/2003 | Lutgen et al. | |
| 2003/0117961 A1 | 6/2003 | Chuah et al. | |
| 2003/0120983 A1 | 6/2003 | Vieregge et al. | |
| 2003/0126223 A1 | 7/2003 | Jenne et al. | |
| 2003/0137941 A1 | 7/2003 | Kaushik et al. | |
| 2003/0174652 A1 | 9/2003 | Ebata | |
| 2003/0174789 A1 | 9/2003 | Waschura et al. | |
| 2003/0179709 A1 | 9/2003 | Huff | |
| 2003/0179748 A1 | 9/2003 | George et al. | 370/389 |
| 2003/0189930 A1 | 10/2003 | Terrell et al. | |
| 2003/0189935 A1 | 10/2003 | Warden et al. | |
| 2003/0195983 A1 | 10/2003 | Krause | |
| 2003/0218986 A1 | 11/2003 | DeSanti et al. | |

| | | |
|---|---|---|
| 2003/0229808 A1 | 12/2003 | Heintz et al. |
| 2003/0236953 A1 | 12/2003 | Grieff et al. |
| 2004/0013092 A1 | 1/2004 | Betker et al. |
| 2004/0013125 A1 | 1/2004 | Betker et al. |
| 2004/0015638 A1 | 1/2004 | Bryn |
| 2004/0024831 A1 | 2/2004 | Yang et al. |
| 2004/0028038 A1 | 2/2004 | Anderson et al. |
| 2004/0057389 A1 | 3/2004 | Klotz et al. |
| 2004/0081186 A1 | 4/2004 | Warren et al. |
| 2004/0081394 A1 | 4/2004 | Biren et al. |
| 2004/0085955 A1 | 5/2004 | Walter et al. |
| 2004/0100944 A1 | 5/2004 | Richmond et al. |
| 2004/0109418 A1 | 6/2004 | Fedorkow et al. |
| 2004/0123181 A1 | 6/2004 | Moon et al. |
| 2004/0141521 A1 | 7/2004 | George ............... 370/463 |
| 2004/0151188 A1 | 8/2004 | Maveli et al. |
| 2004/0153914 A1 | 8/2004 | El-Batal |
| 2004/0174813 A1 | 9/2004 | Kasper et al. |
| 2004/0208201 A1 | 10/2004 | Otake |
| 2004/0267982 A1 | 12/2004 | Jackson et al. |
| 2005/0023656 A1 | 2/2005 | Leedy |
| 2005/0036499 A1 | 2/2005 | Dutt et al. |
| 2005/0117522 A1 | 6/2005 | Basavaiah et al. |
| 2005/0177641 A1 | 8/2005 | Yamagami |
| 2005/0198523 A1 | 9/2005 | Shanbhag et al. |
| 2006/0013248 A1 | 1/2006 | Mujeeb et al. |
| 2006/0034192 A1 | 2/2006 | Hurley et al. |
| 2006/0047852 A1 | 3/2006 | Shah et al. |
| 2006/0074927 A1 | 4/2006 | Sullivan et al. |
| 2006/0184711 A1 | 8/2006 | Pettey |

FOREIGN PATENT DOCUMENTS

| | | |
|---|---|---|
| EP | 0856969 | 1/1998 |
| WO | WO-98/36537 | 8/1998 |
| WO | WO03/088050 | 10/2003 |

OTHER PUBLICATIONS

Webopedia, "SDRAM", http://www.webopedia.com/TERM/S/SDRAM.html.*

Banks, David C., et al., "Link Trunking and Measuring Link Latency in Fibre Channel Fabric", U.S. Appl. No. 60/286,046, 1-52.

Brown, Douglas W., "A State-Machine Synthesizer", *18th Design Automation Conference*, (1981),301-305.

Curtis, A. R., "Design Considerations for 10-Gbit Fibre Channel", Curtis A. Ridgeway, *Distinguished I/O Architect, Storage and Computing ASIC's Division, LSI Logic Corp.*

Malavalli, Kumar , "High Speed Fibre Channel Switching Fabric Devices", *Proceedings of the SPIE, SPIE, Bellingham, VA, USA vol. 1577,*, XP000562869, ISSN: 0277-786X,(Sep. 4, 1991),216-226.

Melhem, et al., "Minimizing Wavelength Conversions in WDM Path Establishment", *Computer Science Department, University of Pittsburgh*, Pittsburgh, PA 15260, (2001), 197-211.

Ridgeway, Curt , "0GFC-40GFC using 4-lane XAUI's", *LSI Logic Presentation—T11/03-069v0*.

Clark, Tom, "Zoning for Fibre Channel Fabrics", Vixel Corporation Paper—XP002185194., (Aug. 1999), pp. 1-6.

Malavalli, Kumar, et al., "Distributed Computing with fibre channel fabric", Proc of the Computer Soc. Int'l Conf., Los Alamitos, IEEE Comp Soc. Press., vol. Conf. 37, XP000340745, (Feb. 24, 1992), pp. 269-274.

Martin, Charles R., "Fabric Interconnection of fibre channel standard nodes", Proceedings of the SPIE, (Sep. 8, 1992), pp. 65-71.

Yoshida, Hu, "LUN Security Considerations for Storage Area Networks," Hitachi Data Systems Paper—XP 002185193 (1999), pp. 1-7.

Claudio DeSanti, "Virtual Fabrics Switch Support" ; VF Switch Support, T11/04-395v2. Sep. 2004, pp. 1-15.

Pelissier et al, "Inter-Fabric Routing" , dated Jul. 30, 2004, Inter Fabric Routing (04-520v0); pp. 1-31.

DeSanti et al, "Virtual Fabrics"; Virtual Fabrics, T11/03-352v0, May 2003; pp. 1-4.

Martin et al , "Virtual Channel Architecture" Presentation by Brocade to T11/03-369V0 dated Jun. 2, 2003.

"Office Action from USPTO dated Jan. 19, 2006 for U.S. Appl. No. 10/212,425".

"Office Action from USPTO dated Dec. 5, 2006 for U.S. Appl. No. 10/212,425".

"Office Action from USPTO dated Mar. 21, 2006 for U.S. Appl. No. 10/889,588".

"Office Action from USPTO dated Sep. 10, 2007 for U.S. Appl. No. 10/889,255".

"Office Action from USPTO dated Sep. 4, 2007 for U.S. Appl. No. 10/889,551".

"Office Action from USPTO dated Sep. 20, 2007 for U.S. Appl. No. 10/889,259".

"Office Action from USPTO dated Sep. 19, 2007 for U.S. Appl. No. 10/894,492".

"Office Action from USPTO dated Oct. 4, 2007 for U.S. Appl. No. 10/894,627".

"Office Action from USPTO dated Oct. 25, 2007 for U.S. Appl. No. 10/894,491".

"Office Action from USPTO dated Oct. 23, 2007 for U.S. Appl. No. 10/894,597".

"Office Action from USPTO dated Oct. 25, 2007 for U.S. Appl. No. 10/894,579".

"Office Action from USPTO dated Oct. 11, 2007 for U.S. Appl. No. 10/894,629".

"Office Action from USPTO dated Oct. 25, 2007 for U.S. Appl. No. 10/894,536".

"Office Action from USPTO dated Nov. 13, 2007 for U.S. Appl. No. 10/894,586".

"Office Action from USPTO dated Oct. 17, 2007 for U.S. Appl. No. 10/894,917".

"Office Action from USPTO dated Sep. 14, 2007 for U.S. Appl. No. 10/894,978".

"Office Action from USPTO dated Apr. 6, 2007 for U.S. Appl. No. 10/956,718".

"Office Action from USPTO dated Oct. 3, 2007 for U.S. Appl. No. 10/956,717".

"Office Action from USPTO dated Jun. 1, 2007 for U.S. Appl. No. 10/961,463".

"Office Action from USPTO dated Sep. 6, 2007 for U.S. Appl. No. 10/889,337".

"Office Action from USPTO dated Dec. 7, 2007 for U.S. Appl. No. 10/961,463".

"Notice of Allowance from USPTO dated Dec. 21, 2007 for U.S. Appl. No. 10/961,463".

"Notice of Allowance from USPTO dated Dec. 20, 2007 for U.S. Appl. No. 10/889,337".

"Office Action from USPTO dated May 21, 2007 for U.S. Appl. No. 10/212,425".

"Office Action from USPTO dated Oct. 18, 2006 for U.S. Appl. No. 10/241,153".

"Office Action from USPTO dated Apr. 3, 2007 for U.S. Appl. No. 10/241,153".

"Office Action from USPTO dated Nov. 15, 2007 for U.S. Appl. No. 10/241,153".

"Office Action from USPTO dated Nov. 15, 2006 for U.S. Appl. No. 10/263,858".

"Office Action from USPTO dated Jul. 11, 2007 for U.S. Appl. No. 10/263,858".

"Office Action from USPTO dated Jan. 19, 2007 for U.S. Appl. No. 10/302,149".

"Office Action from USPTO dated Aug. 20, 2007 for U.S. Appl. No. 10/302,149".

"Office Action from USPTO dated Jul. 3, 2007 for U.S. Appl. No. 10/664,548".

"Office Action from USPTO dated Sep. 20, 2007 for U.S. Appl. No. 10/798,527".

"Office Action from USPTO dated Sep. 20, 2007 for U.S. Appl. No. 10/889,267".

"Office Action from USPTO dated Aug. 31, 2007 for U.S. Appl. No. 10/889,635".

"Office Action from USPTO dated Jan. 9, 2008 for U.S. Appl. No. 10/608,634".

"Office Action from USPTO dated Jan. 9, 2008 for U.S. Appl. No. 10/798,468".

"Examination Report from the European Patent Office dated Oct. 12, 2007 from European Application No. 05 805 632.6".

Malavalli, et al., "Fibre Channel Framing and Signaling (FC-FS) REV 1.10", *NCITS working draft proposed American National Standard for Information Technology*, (Jan. 25, 2001).

\* cited by examiner

FIGURE 2A-iii

INTEGRATED FIBRE CHANNEL FABRIC CONTROLLER

BACKGROUND

1. Field of the Invention

The present invention relates to fibre channel systems, and more particularly to integrating fibre channel fabric controller in a fibre channel switch.

2. Background of the Invention

Fibre channel is a set of American National Standard Institute (ANSI) standards, which provide a serial transmission protocol for storage and network protocols such as HIPPI, SCSI, IP, ATM and others. Fibre channel provides an input/output interface to meet the requirements of both channel and network users.

Fibre channel supports three different topologies: point-to-point, arbitrated loop and fibre channel fabric. The point-to-point topology attaches two devices directly. The arbitrated loop topology attaches devices in a loop. The fibre channel fabric topology attaches host systems directly to a fabric, which are then connected to multiple devices. The fibre channel fabric topology allows several media types to be interconnected.

Fibre channel is a closed system that relies on multiple ports to exchange information on attributes and characteristics to determine if the ports can operate together. If the ports can work together, they define the criteria under which they communicate.

In fibre channel, a path is established between two nodes where the path's primary task is to transport data from one point to another at high speed with low latency, performing only simple error detection in hardware.

Fibre channel fabric devices include a node port or "N_Port" that manages fabric connections. The N_port establishes a connection to a fabric element (e.g., a switch) having a fabric port or F_port. Fabric elements include the intelligence to handle routing, error detection, recovery, and similar management functions.

A fibre channel switch is a multi-port device where each port manages a simple point-to-point connection between itself and its attached system. Each port can be attached to a server, peripheral, I/O subsystem, bridge, hub, router, or even another switch. A switch receives messages from one port and automatically routes it to another port. Multiple calls or data transfers happen concurrently through the multi-port fibre channel switch.

Fibre channel switches use memory buffers to hold frames received and sent across a network. Associated with these buffers are credits, which are the number of frames that a buffer can hold per fabric port.

Fibre channel links/ports can operate (i.e. receive and/or transmit data) in different speeds, for example, 1 gigabit per second ("G"), 2G, 4G, 8G and now 10G. A Fibre Channel Fabric switch needs to be configured and managed efficiently, especially with increasing throughput rates. Conventional fabric switches do not have an efficient way to control, configure and manage fabric switch functionality. Fabric controller function is often performed by a component that is external to the fabric switch itself. This increases the overall cost of the switch. Therefore, it is desirable to have an embedded fabric controller for managing various operations of a fibre channel fabric switch.

SUMMARY OF THE PRESENT INVENTION

In one aspect of the present invention, a fibre channel switch element is provided. The switch element includes an integrated fabric controller on a single chip including a processor module that can control various switch element functions; a serlizer/de-serializer for converting parallel data to serial data for transmission; an on-chip peripheral bus that allows communication between plural components and the processor module; a processor local bus and an interrupt controller that provides interrupts to the processor module.

The integrated fabric controller includes a flash controller and an external memory controller. The external memory may be a synchronous dynamic random access memory.

The integrated fabric controller also includes an Ethernet controller; and a Universal Asynchronous Receiver Transmitter ("UART") module that performs serial to parallel conversion on data received from an external device and parallel to serial conversion of data from the processor module.

The integrated fabric controller also includes an $I^2C$ module that performs serial to parallel conversion on data received from an external $I^2C$ device and parallel to serial conversion of data from the processor module.

The integrated fabric controller further includes a general-purpose input/output interface that is used for controlling and configuring LEDs and obtains system configuration information from LED circuits; and a real time clock module that provides a reference clock for the switch element. The real time clock module includes a battery back-up module.

The integrated fabric controller also includes an interrupt controller that can receive interrupt inputs from both internal and external sources; and a bridge to an internal PCI bus. The PCI bus is synchronous with other bus clocks of the switch element and may operate at a non-standard frequency.

In one aspect of the present invention, fabric controller is integrated with the fabric switch on a single chip. This reduces cost and power required for the overall printed circuit board and improves efficiency.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

Definitions:

The following definitions are provided as they are typically (but not exclusively) used in the fibre channel environment, implementing the various adaptive aspects of the present invention.

"E-Port": A fabric expansion port that attaches to another Interconnect port to create an Inter-Switch Link.

"F_Port": A port to which non-loop N_Ports are attached to a fabric and does not include FL_ports.

"Fibre Channel ANSI Standard": The standard (incorporated herein by reference in its entirety) describes the physical interface, transmission and signaling protocol of a high performance serial link for support of other high level protocols associated with IPI, SCSI, IP, ATM and others.

"FC-1": Fibre channel transmission protocol, which includes serial encoding, decoding and error control.

"FC-2": Fibre channel signaling protocol that includes frame structure and byte sequences.

"FC-3": Defines a set of fibre channel services that are common across plural ports of a node.

"FC-4": Provides mapping between lower levels of fibre channel, IPI and SCSI command sets, HIPPI data framing, IP and other upper level protocols.

"Fabric": The structure or organization of a group of switches, target and host devices (NL_Port, N_ports etc.).

"Fabric Topology": This is a topology where a device is directly attached to a fibre channel fabric that uses destination identifiers embedded in frame headers to route frames through a fibre channel fabric to a desired destination.

Port: A general reference to N. Sub.—Port or F.Sub.—Port.

"L_Port": A port that contains Arbitrated Loop functions associated with the Arbitrated Loop topology.

"N_Port": A direct fabric attached port.

"NL_Port": A L_Port that can perform the function of a N_Port.

"Switch": A fabric element conforming to the Fibre Channel Switch standards.

Fibre Channel System:

To facilitate an understanding of the preferred embodiment, the general architecture and operation of a fibre channel system will be described. The specific architecture and operation of the preferred embodiment will then be described with reference to the general architecture of the fibre channel system.

Figure 1:
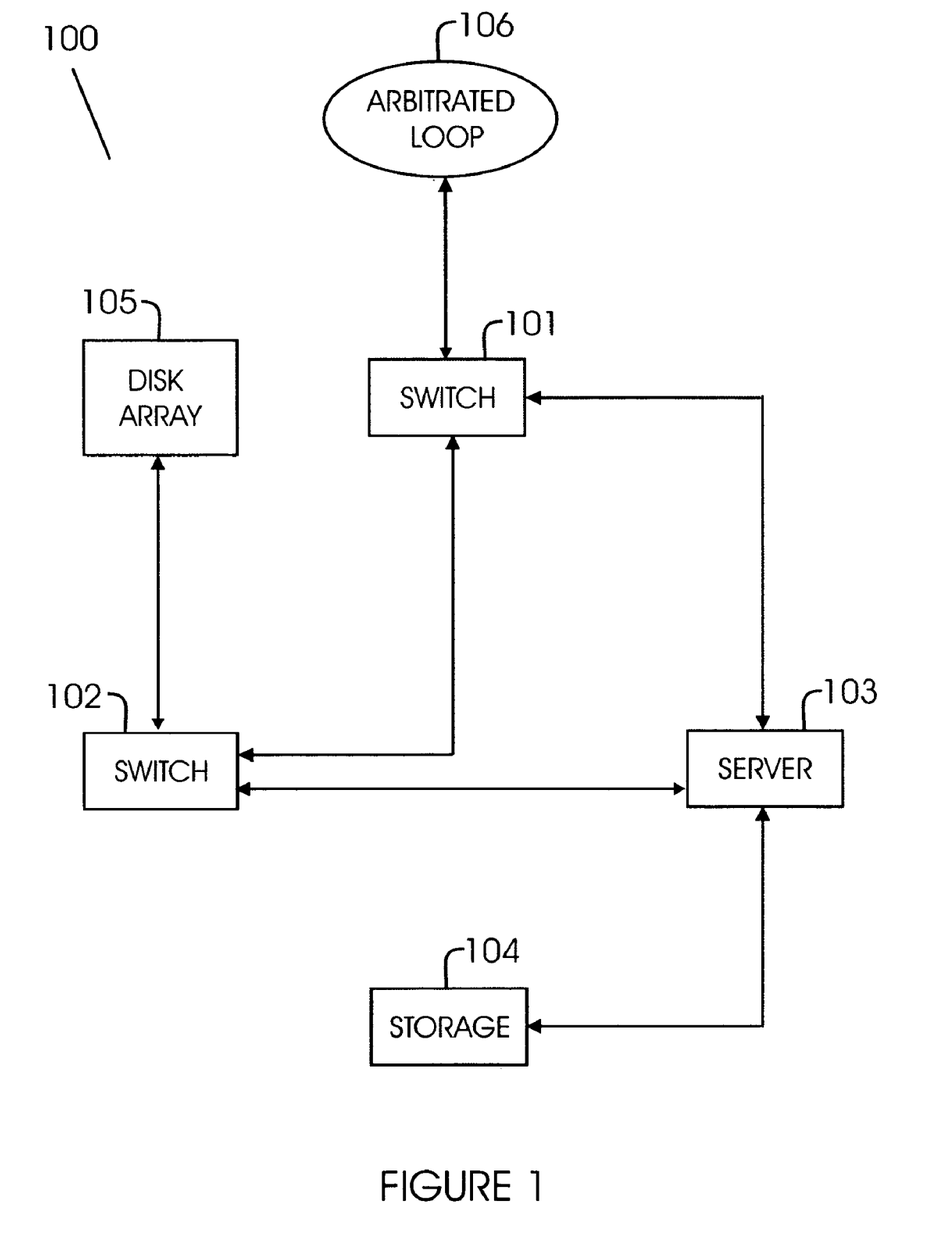
FIG. 1 shows an example of a Fibre Channel network system.

FIG. 1 is a block diagram of a fibre channel system 100 implementing the methods and systems in accordance with the adaptive aspects of the present invention. System 100 includes plural devices that are interconnected. Each device includes one or more ports, classified as node ports (N_Ports), fabric ports (F_Ports), and expansion ports (E_Ports). Node ports may be located in a node device, e.g. server 103, disk array 105 and storage device 104. Fabric ports are located in fabric devices such as switch 101 and 102. Arbitrated loop 106 may be operationally coupled to switch 101 using arbitrated loop ports (FL_Ports).

The devices of FIG. 1 are operationally coupled via "links" or "paths". A path may be established between two N_ports, e.g. between server 103 and storage 104. A packet-switched path may be established using multiple links, e.g. an N-Port in server 103 may establish a path with disk array 105 through switch 102.

Fabric Switch Element

Figure 2A:
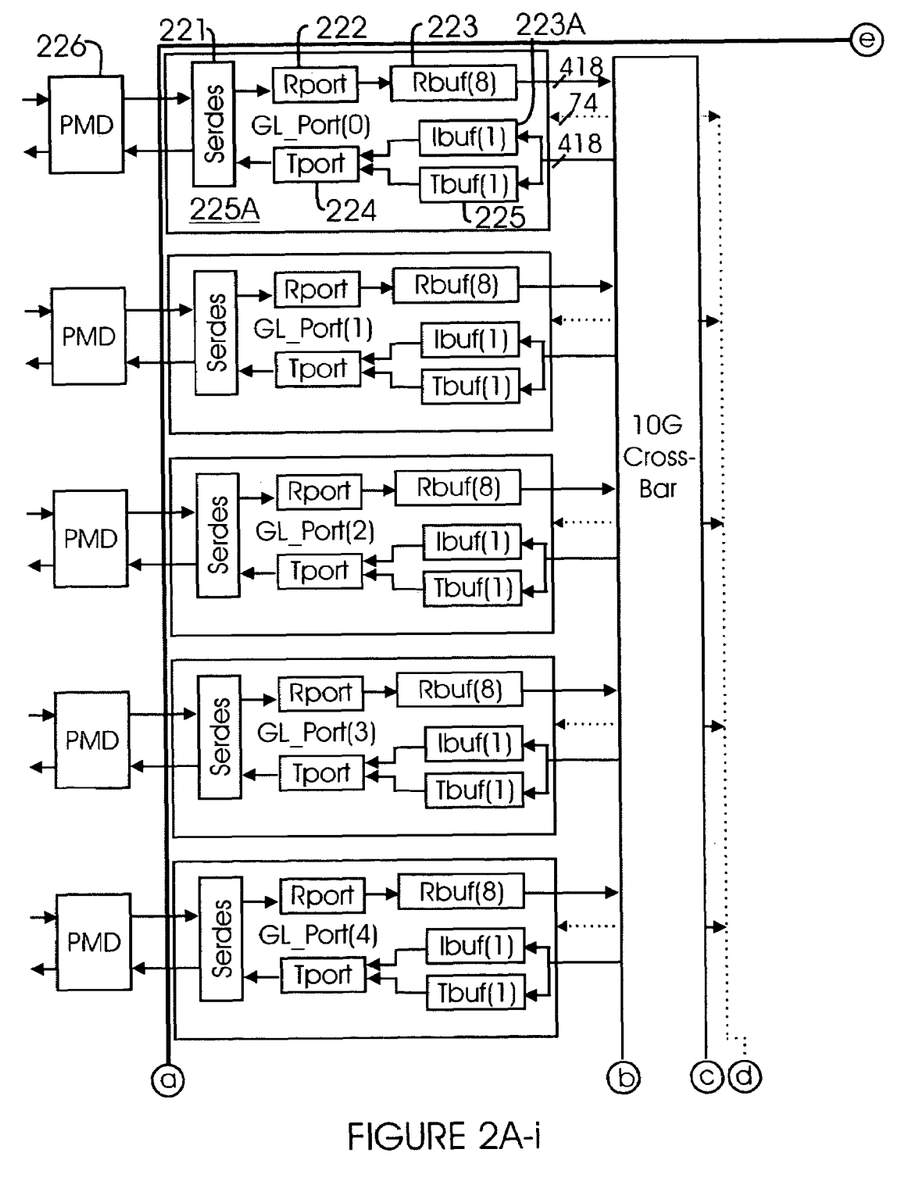
FIG. 2A shows an integrated fabric controller in a fibre channel switch element, according to one aspect of the present invention.

FIG. 2A is a block diagram of a 20-port ASIC fabric element 200A according to one aspect of the present invention with an integrated fabric controller 200A. ASIC 200A provides non-blocking fibre channel class 2 (connectionless, acknowledged) and class 3 (connectionless, unacknowledged) service between any ports. It is noteworthy that ASIC 200A may also be designed for class 1 (connection-oriented) service, within the scope and operation of the present invention as described herein.

The fabric element of the present invention is presently implemented as a single CMOS ASIC, and for this reason the term "fabric element" and ASIC are used interchangeably to refer to the preferred embodiments in this specification.

Figure 2B:
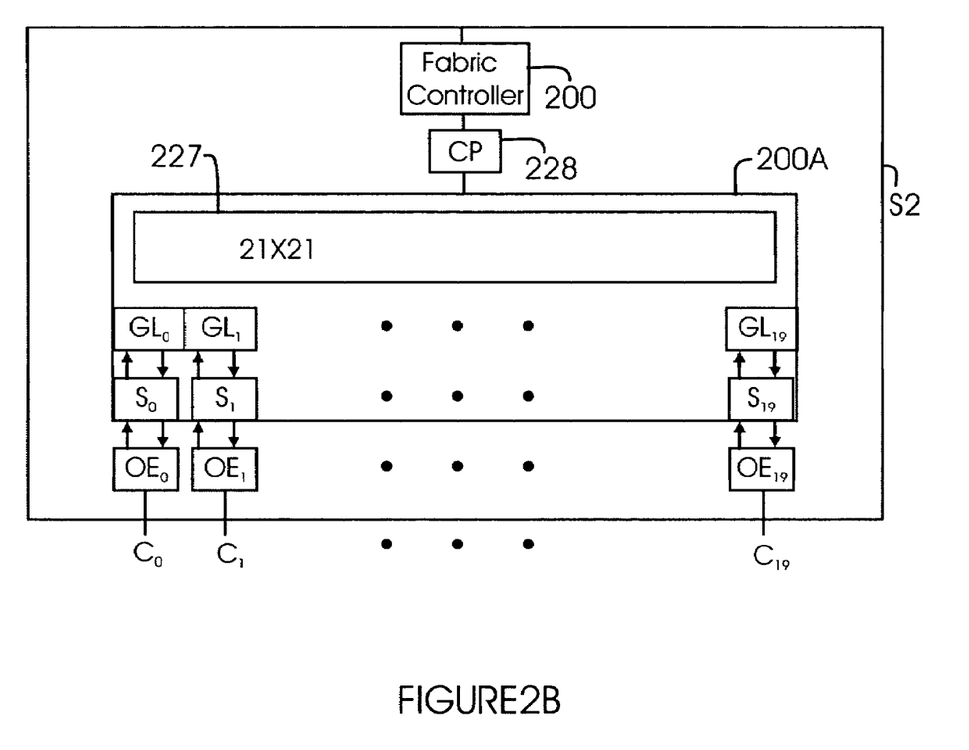
FIG. 2B shows an example of a Fibre Channel switch element, according to one aspect of the present invention.

ASIC 200A has plural ports numbered as GL0 through GL19 in FIG. 2B(although FIG. 2B shows 20 ports, the present invention is not limited to any particular number of ports). These ports are generic to common Fibre Channel port types, for example, F_Port, FL_Port and E-Port. In other words, depending upon what it is attached to, each GL port can function as any type of port. Also, the GL port may function as a special port useful in fabric element linking, as described below.

For illustration purposes only, all GL ports are drawn on the same side of ASIC 200A in FIG. 2A. However, the ports may be located on all sides of ASIC 200A. This does not imply any difference in port or ASIC design. Actual physical layout of the ports will depend on the physical layout of the ASIC.

Each port has a port control module 225A and is coupled to a physical media device ("PMD") 226. Port control module 225A includes a transmit port (TPORT) 224 and a receive port (RPORT) 222. TPORT 224 includes a transmit buffer (TBUF) 225 and RPORT 222 includes a receive buffer (RBUF) 223. RBUF 223 functions to receive and temporarily hold a frame during a routing operation, while TBUF 225 is used on the transmit side. Port control module 225A includes a buffer ("IBUF") 223A that provides fabric controller 200 the means for transmitting frames for special purposes.

Each port control module 225A has a serial/deserializer (SERDES) 221 (designated as S0-S19 in FIG. 2B). Ideally, the SERDES functions are implemented on ASIC 200A for efficiency, but may alternatively be external to each GL_Port. The SERDES converts parallel data into a serial data stream for transmission and converts received serial data into parallel data. The 8 bit to 10 bit encoding enables the SERDES to generate a clock signal from the received data stream.

ASIC 200A also includes switch crossbar 227, which includes a number of switch crossbars for handling specific types of data and data flow control information. For illustration purposes only, switch crossbar 227 is shown as a single crossbar. Switch crossbar 227 is a connectionless crossbar (packet switch) of known conventional design, sized to connect 21×21 paths.

ASIC 200A also includes a control port ("CPORT") 228 that receives and holds control information from fabric controller 200, so that fabric controller 200 can change characteristics or operating configuration of ASIC 200A by placing certain control words. Control port 228 includes control buffers 228A and 228B for receive and transmit sides, respectively. A special buffer (IBUF) 201 is also provided where fabric controller 200 can store special instructions and commands. CPORT 228 also includes a Peripheral Component Interconnect ("PCI") interface module 229 that allows interface with fabric controller 200 via a PCI bus 230 and PCI bridge 231. It is noteworthy that other interconnect schemes (including non-standard buses (not shown)) may be used to couple CPORT 228 to the fabric controller 200.

FIG. 2B shows a 20-channel switch chassis S2 using ASIC 200A and fabric controller 200. S2 will also include other elements, for example, a power supply (not shown). The 20 GL_Ports correspond to channel C0-C19.

Each GL_Port may have an optical-electric converter, designated as OE0-OE19 connected with its SERDES through serial lines, for providing fibre optic input/output connections, as is well known in the high performance switch design. The converters connect to switch channels C0-C19. It is noteworthy that the ports can connect through copper paths or other means instead of optical-electric converters.

Embedded Fabric Controller:

In one aspect of the present invention, an embedded fabric controller 200 (referred to as controller 200) is provided in ASIC 200A that configures, initializes, assists in diagnostics, monitors ASIC 200A, configures ports, manages link state machines and loop state machines, handles SOFf frames, or server requests (for example, name server, management server requests).

Controller 200 includes a clock control/reset module 214 that controls and resets the clocks in ASIC 200A. Module 214 also includes a reset switch de-bounce circuit (not shown) that is used to reset ASIC 200A.

In one aspect all clocks are synchronous, except for the Fibre Channel recovered clocks. Three types of resets can be performed using module 214: (1) System reset by writing certain bits in processor 216 registers (not shown), by a Watchdog reset or by writing to general purpose input/out module GPIO 209. System reset is designed for resetting the system. (2) Chip reset is designed to reset ASIC 200A only; and (3) Core reset is designed to reset processor module (referred to herein as "processor") 216.

Processor module 216 includes a processor core 216A, which in one aspect may be a reduced instruction set computer ("RISC") processing unit. Trace module 216C is provided to trace various program counters, while JTAG module 216B is used for debugging.

Two cache units, data cache ("D-cache") 216D and instruction cache ("I-cache") 216E are also provided. I-cache 216E provides one or two instructions per cycle to core 216A. D-cache 216D is provided to enable data transfers. D-cache 216D contains a single-element command and store data queue to reduce pipeline stalls. This enables D-cache 216D to process load/store and cache control instructions.

Device control register ("DCR") bus 215 transfers data between processor 216's general purpose registers and DCR device control and status registers. In one aspect, DCR bus 215 is a fully synchronous 32-bit wide bus with 10 bit addressing. Processor 216 is the bus master and other devices are slaves. DCR bus 215 is used to configure SDRAM controller 206, external bus controller ("EBC") 203, arbiter ("ARB") 205, bus ("OPB") 213, universal interrupt controller ("UIC") 217, Ethernet controller 207 and real time clock ("RTC") module 210.

Controller 200 includes a processor local bus 220 (also referred to as bus 220) that is used to access memory through bus interface units. In one aspect, bus 220 may be 64-bit wide operating at 106.25 Mhz. EBC 203, memory controller ("SDRAM controller") 206, PCI bridge 231, and on-chip peripheral bus ("OPB") 213 (also referred to as bus 213) are slaves on bus 220. Processor 216 components, and Ethernet dedicated direct memory access module ("MAL") 219 are masters.

Arbitration module ("arbiter" or "Arb") 205 controls access to bus 220 by arbitrating between I-CACHE 216E, D-Cache 216D, PCI bridge 231 and Ethernet direct memory access module 219. Arbiter 205 is also coupled to DCR bus 215.

PCI bus 230 is an internal bus that couples CPORT 228 via interface 229 and PCI bridge 231. PCI bridge 231 configures the PCI bus 230 under the control of processor 216.

Controller 200 includes a synchronous dynamic random access memory (SDRAM) controller 206 and a bus control module 221. Bus control module 221 repositions data onto bus 220 in correct byte positions for memory read operations. Bus control module 221 also positions write data to a correct byte location and facilitates sharing of external data bus for access to different memory devices.

SDRAM controller 206 includes a bus 220 slave, DCR bus 215 interface, and an external SDRAM interface. SDRAM controller 206 can assert an interrupt to universal interrupt controller 217 to report error status.

EBC 203 transfers data between bus 220 and external memory or peripheral devices 203A attached to an external memory bus (not shown). EBC 203 allows attachment of memory devices such as read only memory ("ROM"), flash memory or static random access memory ("SRAM") devices. Processor 216 can program EBC 203 device control registers. EBC 203 can also assert an interrupt to universal interrupt controller 217 to report error status.

NAND (and or NOR, used interchangeably) flash controller 204 is an interface for a NAND flash device (not shown) that operates as an indirect memory device. Through EBC 203, special control and status functions are provided for both read and write operations of the NAND flash device. The flash device may be of different data width (for example, 8-bit or 16-bit).

Controller 200 also includes an Ethernet interface 207, which is compliant with ANSI/IEEE standard 802.3, and IEEE 802.3u supplement (the standards are incorporated herein by reference in their entirety). Interface 207 includes a media access controller (not shown) that interfaces with an external Ethernet PHY layer, Ethernet memory banks (FIFOs) and OPB 213 for control and status. Interface 207 can generate an interrupt to UIC 217.

MAL module 219 provides an intermediate layer between Ethernet interface 207 and processor 216 by accessing bus 220 and transmit and receive FIFOs of Ethernet interface 207. MAL 219 can generate interrupts using the Universal Interrupt controller 217.

In one aspect of the present invention, bus 213 maps plural devices to processor 216's memory space. The devices include modules 207, 208, 208A and 209. Bus 213 can operate at 53.125 Mhz. It is noteworthy that the devices connected to bus 220 can transfer data to bus 213 via bridge module 218.

In one aspect of the present invention, bridge 218 is a slave for bus 220 and master for bus 213 and is coupled to DCR bus 215. Bridge 218 provides support for half-word and byte reads and writes; dynamic bus sizing for varying bus 213 slave devices; FIFOS (memory buffers) for reads and writes; data packing for bus 213 slave devices and a timer for generating bus 213 time out errors.

Universal Asynchronous Receiver Transmitter ("UART") module 208A performs serial to parallel conversion on data received from an external device (not shown) and parallel to serial conversion of data from processor 216. UART module 208A provides a serial port for low-level control and status communications for ASIC 200A. UART 208A is functionally coupled to bus 213. All UART 208A registers are memory mapped and are accessed via byte Load/Store processor 216 instructions. UART 208A can generate an interrupt to universal interrupt controller 217.

$I^2C$ module 208 performs serial to parallel conversion on data received from an external $I^2C$ device (not shown) and parallel to serial conversion of data from processor 216. $I^2C$ module 208 provides firmware with a single master for $I^2C$ communications. All $I^2C$ module 208 registers are memory mapped and are accessed via byte Load/Store processor 216 instructions. $I^2C$ 208 is functionally coupled to bus 213. $I^2C$ 208 can generate an interrupt to universal interrupt controller 217.

RTC module 210 provides a running real time clock to provide a reference for ASIC 200A. RTC 210 can also assert an interrupt to universal interrupt controller 217. An oscillator ("OSC") 211 is used to provide the reference clock for RTC 210. In one aspect, OSC 211 uses a 32.768 KHZ crystal to provide a 32.768 KHz reference clock. A battery voltage 210A is provided as a backup so that RTC 210 continues to keep time even after power has been removed.

General-purpose input/output ("GPIO") controller 209 controls 32 bi-directional pins (not shown). Firmware for ASIC 200A can control plural I/O modules. All GPIO 209 registers are memory mapped and are accessed via byte Load/Store processor 216 instructions.

PCI bridge 231 provides a connection between bus 220 and PCI bus 230. PCI bus 230 runs at 53.125 MHz and bus 220 operates at 106.25 MHz. PCI bus 230 can operate synchronously with other ASIC 20 bus clocks, including non-PCI standard clock frequency.

UIC 217 provides control, status and communications between various ASIC 200A components and processor 216 by generating interrupts. UIC module 217 supports plural interrupts (for example, 32), including internal and external interrupts. UIC 217 interfaces with DCR bus 215. UIC 217 interrupts can be programmed by the firmware to be critical or non-critical.

Certain bits in GPIO module 209 control LED (light emitting diode) control/configuration module 202. These bit values are used to control when LEDs are turned on and turned off. LED module 229A in CPORT 228 is also used to identify the configuration of module 202.

In one aspect of the present invention, fabric controller is integrated with the fabric switch on a single chip. This reduces cost and power required for the overall printed circuit board and improves efficiency.

Although the present invention has been described with reference to specific embodiments, these embodiments are illustrative only and not limiting. Many other applications and embodiments of the present invention will be apparent in light of this disclosure and the following claims.

What is claimed is:

1. A fibre channel switch element, comprising:
   a plurality of ports to receive and transmit fibre channel frames: and
   a fabric controller embedded on a same chip as the plurality of ports to configure and to initialize the fibre channel switch element, to configure the plurality of ports, to monitor the fibre channel switch element, to manage at least a link state machine and a loop state machine and to process name server requests, the embedded fabric controller comprising:
   a processor module to control a plurality of switch element functions, wherein the processor module includes a core module, a trace module to trace program counters, a first cache to store program instructions and a second cache to enable data transfers;
   a serializer/de-serializer to convert parallel data to serial data for transmission; and to convert received serial data to parallel data;
   a device control register (DCR) bus that transfers data between the processor module and a plurality of registers to configure a static dynamic random access memory (SDRAM) controller, an external bus controller and (EBC), an arbitration module, a universal interrupt controller, an Ethernet Controller and a real time clock module;
   a processor local bus to access an external memory via the EBC;
   an on-chip peripheral bus to allow communication between the processor module and at least one or more of a universal asynchronous receiver transmitter (UART) module, a general purpose input and output interface (GPIO), the Ethernet controller, a plurality of modules coupled to the processor local bus;
   a bus that couples a control port of the fibre channel switch element to the processor local bus via a bridge; a processor local bus and
   the universal interrupt controller interfacing with the DCR bus provides interrupts to the processor module regarding control, status and communication between a plurality of the fibre channel switch element modules.

2. The switch element of claim 1, wherein the embedded fabric controller includes a flash that provides access to the processor module to an external flash device via the external bus controller.

3. The switch element of claim 1, wherein the external memory includes one or more of a synchronous dynamic random access memory, a read only memory, and a flash memory device.

4. The switch element of claim 1, wherein the Ethernet controller for the embedded fabric controller includes a media access controller to interface with a physical Ethernet layer and the on chip peripheral bus.

5. The switch element of claim 1, wherein the ("UART") UART module for the embedded fabric controller is operationally coupled to the on chip peripheral bus and performs serial to parallel conversion on data received from an external and parallel to serial conversion of data received from the processor module.

6. The switch element of claim 1, wherein the embedded fabric controller includes an 12C module that performs serial to parallel conversion on data received from an external 12C device and parallel to serial conversion of data received from the processor module.

7. The switch element of claim 1, wherein the certain bits for the general-purpose input/output interface of the embedded fabric controller are used to control and to configure a light emitting diode (LED) module to control when a plurality of LEDs are turned on and turned off; and a module within the control port obtains system configure information from the LED module.

8. The switch element of claim 1, wherein the embedded fabric controller includes a real time clock module that provides a reference clock for the fibre channel switch element.

9. The switch element of claim 8, wherein the real time clock module includes a battery back-up module so that the real time clock module continues to keep time when input power is unavailable.

10. The switch element of claim 1, wherein the general-purpose input/output interface for the embedded controller is used to monitor and to control components external to the fibre channel switch element.

11. The switch element of claim 1, further comprises: a reset switch de-bounce circuit to reset the fibre channel switch element by resetting certain bits in a register for the processor module, by using a watchdog timer or by writing to certain registers for the GPIO.

12. The switch element of claim 1, wherein the an universal interrupt controller for the embedded fabric controller that can receives inputs from modules internal to the fibre channel switch element and modules external to the fibre channel switch element for generating interrupts to the processor module.

13. The switch element of claim 1, wherein the bridge coupled to the bus is a PCI bridge and the bus is a PCI bus.

14. The switch element of claim 13, wherein the PCI bus is synchronous with other bus clocks of the switch element without using a bus synchronizer.

15. The switch element of claim 13, wherein the local processor bus operates at twice the frequency of the PCI bus.

16. The switch element of claim 2, wherein the flash device is a NAND flash device or a NOR flash device operating at different data widths.

17. The switch element of claim 1, wherein the SDRAM controller interfaces with a bus control module that repositions data onto the processor local bus for the external memory read operations.

18. The switch element of claim 1, wherein the arbitration module controls access to the processor local bus by arbitrating between a plurality of modules.

19. The switch element of claim 1, wherein the EBC, the SDRAM controller, the bridge and the on chip peripheral bus operate as slaves for the processor local bus while the processor module operates as a master for tile processor local bus integrated fabric.

* * * * *

UNITED STATES PATENT AND TRADEMARK OFFICE
CERTIFICATE OF CORRECTION

PATENT NO.       : 7,404,020 B2
APPLICATION NO.  : 10/894529
DATED            : July 22, 2008
INVENTOR(S)      : Frank R. Dropps et al.

It is certified that error appears in the above-identified patent and that said Letters Patent is hereby corrected as shown below:

On page 3, in column 2, under "Other Publications" line 55, delete "Nov. 15, 2007" and insert -- Nov. 16, 2007 --, therefor.

On page 4, in column 1, under "Other Publications" line 6, delete "from" and insert -- for --, therefor.

In column 5, line 17, after "reset" insert -- , --.

In column 7, line 41, in claim 1, after "frames" delete ":" and insert -- ; --, therefor.

In column 7, line 61, in claim 1, before "(EBC)" delete "and".

In column 8, line 13, in claim 2, after "bridge;" insert -- controller --.

In column 8, line 24, in claim 4, delete "laver" and insert -- layer --, therefor.

In column 8, line 25, in claim 5, after "wherein the" delete "("UART")".

In column 8, line 28, in claim 5, after "external" insert -- device --.

In column 8, line 32, in claim 6, delete "12C" and insert -- I$^2$C --, therefor.

In column 8, line 33, in claim 6, delete "12C" and insert -- I$^2$C --, therefor.

In column 8, line 36, in claim 7, after "wherein" delete "the".

In column 8, line 41, in claim 7, delete "configure" and insert -- configuration --, therefor.

In column 8, line 60, in claim 12, after "the" delete "an".

In column 8, line 61-62, in claim 12, after "controller" delete "that can".

Signed and Sealed this

Fourteenth Day of December, 2010

David J. Kappos
*Director of the United States Patent and Trademark Office*

CERTIFICATE OF CORRECTION (continued)
U.S. Pat. No. 7,404,020 B2

In column 9, line 6, in claim 16, after "wherein the" insert -- external --.

In column 10, line 8, in claim 19, delete "tile" and insert -- the --, therefor.

In column 10, line 9, in claim 19, after "bus" delete "integrated fabric".